United States Patent [19]

Reich, II

[11] Patent Number: 4,487,446
[45] Date of Patent: Dec. 11, 1984

[54] COMBINED BUMPER AND AIR STORAGE SYSTEM

[75] Inventor: Egon Reich, II, 2076 Mandarin, Costa Mesa, Calif. 92626

[73] Assignee: Egon Reich, Newport Beach, Calif.

[21] Appl. No.: 399,685

[22] Filed: Jul. 19, 1982

[51] Int. Cl.³ ............................................. B60C 23/10
[52] U.S. Cl. .................................... 296/106; 296/117; 137/899.4
[58] Field of Search ...................... 293/102, 106, 107; 280/711; 137/355, 899.4; 296/117

[56] References Cited

U.S. PATENT DOCUMENTS

| | | | |
|---|---|---|---|
| 1,771,889 | 7/1930 | Hobart | 137/899.4 |
| 1,995,088 | 3/1935 | Bellamy | 293/106 |
| 2,826,354 | 3/1958 | Field | 137/899.4 |
| 2,906,366 | 9/1959 | Mapes | 293/107 |
| 3,338,614 | 8/1967 | Sadler, Jr. | 293/106 |
| 3,761,108 | 9/1973 | Hemmings | 280/711 |
| 3,774,948 | 11/1973 | Gouirand | 293/107 |
| 3,822,908 | 7/1974 | Gouirand | 293/107 |

FOREIGN PATENT DOCUMENTS 2444276  4/1975  Fed. Rep. of Germany ...... 293/107

Primary Examiner—David A. Scherbel
Assistant Examiner—Dennis H. Pepper
Attorney, Agent, or Firm—Gordon L. Peterson

[57] ABSTRACT

An "air bumper" which is adapted for attachment to a vehicle to serve as a bumper. The air bumper has a chamber which stores a supply of compressed air that may be used to inflate tires.

1 Claim, 6 Drawing Figures

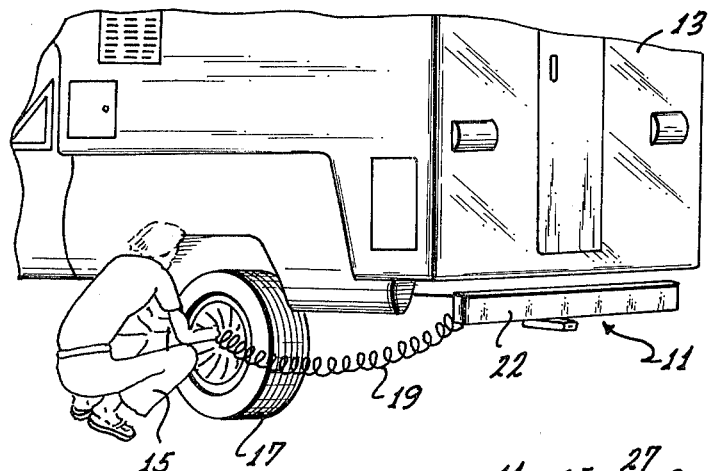
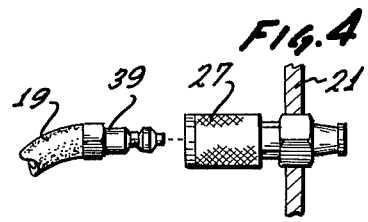
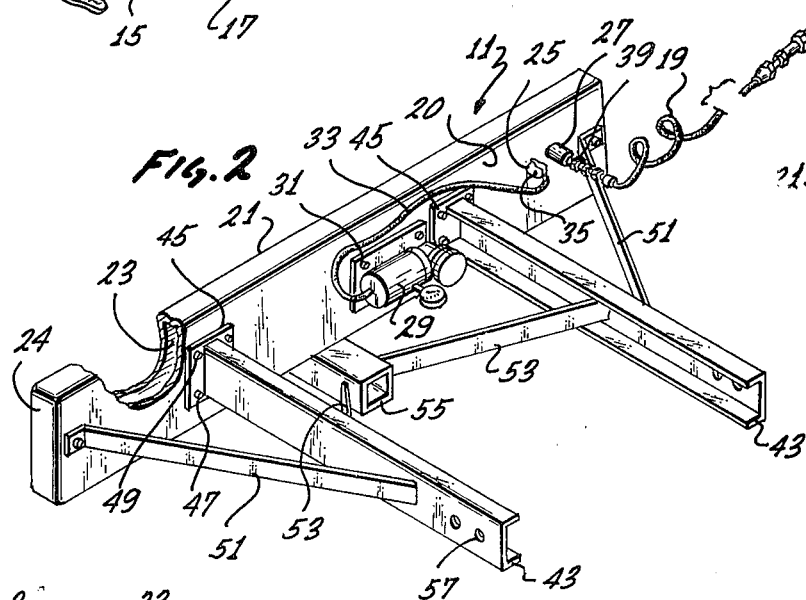
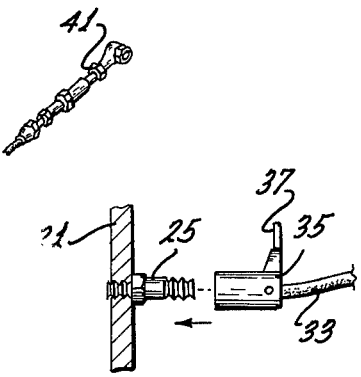
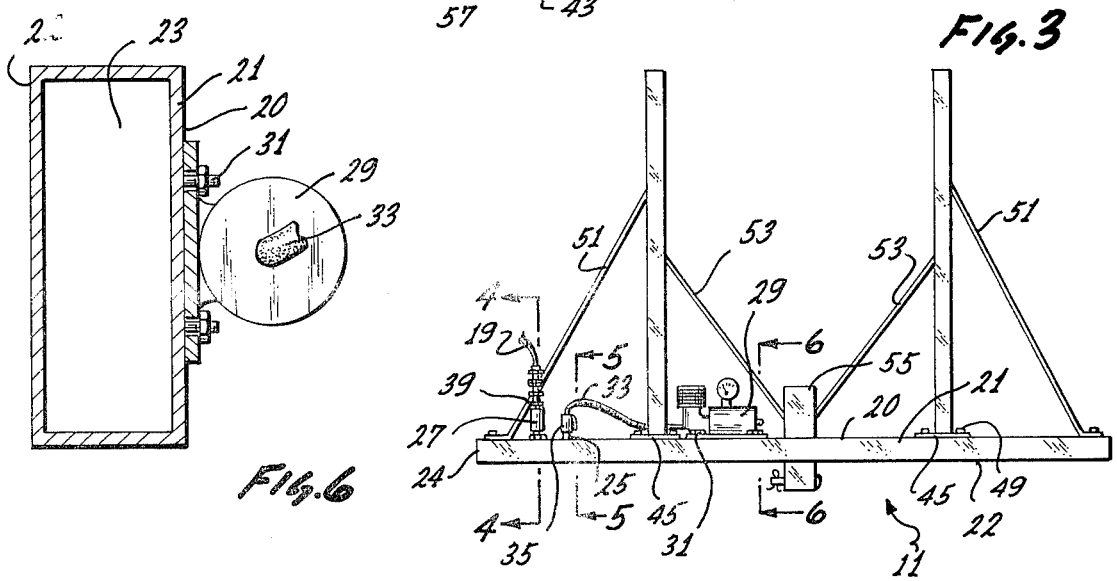

COMBINED BUMPER AND AIR STORAGE SYSTEM

BACKGROUND OF THE INVENTION

For people who enjoy off-road vehicles, such as dune buggies and four-wheel drive vehicles, and drive them into the wilderness or places far from any gas station, the problem of flat tires can be truly agonizing. This is especially so if a spare tire is not available or if multiple flat tires occur during a single trip.

In an effort to solve this problem, many people equip their vehicles with containers to carry a supply of compressed air. The compressed air supply may be utilized to inflate a flat tire at remote places. Some people carry small air compressors that operate on the cigarette lighter of the vehicle and use it to inflate a flat tire. Of course, conventional hand pumps can also be used.

Hand pumps require a great deal of effort on the part of the user, and both the hand pumps and the samll air compressors take a long time to inflate a tire. The compressed air storage tanks are an unsightly addition to a vehicle.

SUMMARY OF THE INVENTION

The problems of the prior art are overcome by the present invention.

The present invention provides a vehicle bumper having a hollow chamber which is used to store compressed air. The term "air bumper" is used hereinafter to refer to the hollow bumper. The hollow chamber may be charged with compressed air from a compressed air outlet at a service station and/or by an air compressor carried by the vehicle, preferably, on the air bumper.

The air compressor can be operated while the vehicle is running to keep the hollow chamber of the bumper adequately filled with compressed air.

Valve means is provided on the bumper for controlling the flow of air into and out of the chamber. The bumper preferably has an inner face and an outer face, and to minimize the likelihood of damage to the valve means, the valve means is preferably mounted on the inner face of the bumper. Similarly, the air compressor can advantageously be mounted on the inner face of the bumper where it will be adequately protected, although the air compressor could be mounted at other locations on the vehicle.

The bumper of this invention can be provided as original vehicle equipment or as a retrofit item. Although the bumper can be attached to the vehicle in various different ways, including welding, it is preferred to provide mounting means which includes at least one frame member for attachment to the vehicle frame.

Various conduits and fittings may also be provided to facilitate use of the bumper for air storage purposes. Thus, an inlet conduit may couple the air compressor to the inlet valve and an outlet conduit may be provided for attachment to the outlet valve. Appropriate quick-disconnect fittings can be used to facilitate the connection and disconnection of the conduits to the valves.

The invention, together with additional features and advantages thereof, may best be understood by reference to the following description taken in connection with the accompanying illustrative drawings.

BRIEF DESCRIPTION OF THE DRAWINGS

FIG. 1 is a perspective view of a vehicle having the air bumper of the present invention mounted thereon and is shown being used to inflate a tire.

FIG. 2 is a perspective view of the air bumper, partly in section, with an air compressor attached thereto.

FIG. 3 is a top view of the air bumper of FIG. 2.

FIG. 4 is a fragmentary sectional view along line 4—4 of FIG. 3 showing the air outlet valve of the air bumper.

FIG. 5 is a fragmentary sectional view along lines 5—5 of FIG. 3 showing the air inlet valve of the air bumper.

FIG. 6 is a sectional view along line 6—6 of FIG. 3.

DETAILED DESCRIPTION OF THE PREFERRED EMBODIMENT

Looking first to FIG. 1, therein is shown an air bumper or apparatus 11 attached to the rear periphery of a vehicle 13. The air bumper 11 is configured to look like a conventional bumper and thereby presents no unsightly addition to the vehicle. An operator 15 is shown utilizing the air bumper to inflate a tire 17 of the vehicle. The air bumper 11 stores a supply of compressed air which is passed to the tire 17 through a hose or outlet conduit 19. The operator 15 controls the flow of air into the tire 17 by a hand-held valve 41 as is well known in the art. Thus the air bumper 11 is adapted to serve as a bumper for a vehicle and as an air storage tank.

In FIGS. 2-6 the details of construction of the air bumper are shown. The air bumper 11 comprises an elongated hollow bumper 21 having an inner face 20 and an outer face 22 (FIG. 6). The bumper 21 has a chamber 23 therein. The chamber 23 is airtight and is adapted to contain compressed air. The bumper 21 may be formed of a rectangular or cylindrical tube with its two ends sealed as by end plates 24 welded to the ends of the tube. It is preferred that the bumper 21 be constructed of material having sufficient strength to contain the compressed air at a desired pressure and to serve as a bumper for a vehicle. For example, the bumper 21 may be made of steel, aluminum, reinforced fiberglass or molded material. The configuration or shape of the bumper 21 should be such that it can be used as a bumper for vehicles.

The air bumper 11 has an air inlet valve 25 (FIG. 5) and an air outlet valve 27 (FIG. 4) both of which are mounted on the inner face 20. The inlet valve 25 is a normally closed valve and may be of the type commonly used on automobile tires. The chamber 23 (shown in detail in FIG. 6) may be filled with compressed air through the air inlet valve 25 from a compressed air supply at a service station in a manner well known in the art. However, sometimes it may be desirable to have an air compressor provided on the vehicle 13 so that the chamber 23 can be charged when the vehicle 13 is not in the vicinity of a service station. For such purposes, an air compressor 29 is provided. Preferably, the air compressor 29 is attached to the bumper 21 at a convenient location, such as the rear face 20, by fastener means, such as bolts and nuts 31 and is driven by an electric motor powered by the vehicle battery. A hose or inlet conduit 33 leads the compressed air from the air compressor 29 to the air inlet valve 25. The hose 33 is provided with a conventional quick disconnect clip 35 which can be removably attached to the air inlet valve 25, as shown in FIG. 5. The lever 37 on the connecting clip 35 serves to lock the connecting clip 35 to the air inlet valve 25 and attachment of the clip opens the inlet valve 25 in the same manner as the conventional tire valve is opened by the common service station air hose. When it is desired to fill the chamber 23 at a service station, the lever 37 is operated, the connecting clip 35 is removed from the air inlet valve 25, and the usual air hose at the service station is connected to the air inlet valve 25. In this manner, the chamber 23 may be filled with compressed air. Of course, this requires that the air inlet valve 25 be a standardized size, like, for example, the air inlet valve of the tire 17.

The air outlet valve 27 is attached to the bumper 21 such that it communicates with the chamber 23 and compressed air within the chamber 23 can exit only through the air outlet valve 27. The air outlet valve 27 may be a quick-disconnect-type check valve, in which case, the air outlet valve 27 may be said to comprise the female portion of a quick-connect valve arrangement. A connector 39 representing the male portion of the quick-connect arrangement is coupled to the hose 19 at one end thereof. When the connector 39 is attached to the air outlet valve 27, the compressed air contained within the chamber 23 passes through the hose 19. At the other end of the hose 19, a hand-held, manually operable control valve 41 is provided. The operator 15 can control the air being charged into the tire 17 by means of the control valve 41. The control valve 41 is well known in the art.

The air bumper 21 is attached to the vehicle 13 in a manner usual for attachment of bumpers. For example, FIG. 2 shows mounting means which comprise two spaced apart frame members or channels 43. Each of the channels 43 has an attaching plate 45 securely attached to one end thereof. Each of the attaching plates 45 has a plurality of bolt openings 47 through which bolts 49 can pass. The bolts 49 are securely attached to the face 20 of the bumper 21 as by welding and are positioned to pass through the bolt openings 45. This arrangement of the bolts 49 and the bolt openings 47 is similar to that shown in FIG. 6. FIG. 6 shows the air compressor 29 attached to the inner face 20 of the bumper 21, and the manner of attachment thereof is similar to that of the attaching plate 45 and the bumper.

The bumper 21 is further supported by bars 51. The bars 51 are attached to the channels 43 by welding and to the bumper 21 at one end thereof by means of bolts in a manner similar to that described for channels 43 and the air compressor 29. In addition, second bars 53 welded to the channels 43 support an optional trailer attachment pipe 55. It should be understood that the channels 43 and the bars 51 and 53 are merely an example of one form of means for mounting the bumper on the vehicle 11. Channels 43 are securely attached to the frame for the vehicle 11 at openings 57.

To install the air bumper of the present invention, it is only necessary that the conventional bumper that may be present on a vehicle be removed and the air bumper be attached in its place. Alternatively, the bumper 21 may be welded or otherwise attached to the conventional bumper on the vehicle.

In operation, the chamber 23 is charged with compressed air and then the operator 15 may drive his vehicle 13 to any remote area with confidence. If the vehicle gets a flat tire, the operator merely attaches the air hose 19, which may be conveniently stored in the vehicle, to the air outlet valve 27 and has a ready supply of compressed air to inflate the flat tire. Thereafter, the operator can continue on his journey and switch on the air compressor 29 so that the chamber 23 is once again filled to its capacity. In this manner, the air compressor 29 is operated only when the vehicle is running and, thereby, it does not present a serious drain on the vehicle power supply. The air compressor 29 may be provided with automatic cut-off controls which are well known in the art.

It should be stated that the air inlet valve 25, the air outlet valve 27 and the compressor 29 are shown situated on the inner face 20 of the air bumper. This protects these components and substantially hides them from view. However, this positioning of these components is not essential to practice this invention. Further, it will be readily apparent to those familiar with the art that, instead of having separate air inlet and air outlet valves, it may be possible to have a single valve which would serve the function of an air inlet valve and an air outlet valve also.

While the invention has been described with a certain degree of particularity, it is manifest that many changes may be made in the details of the embodiment illustrated, without departing from the spirit and scope of this disclosure. It is understood that the invention is not limited to the embodiment set forth herein for purposes of exemplification but is to be limited only by the scope of the attached claims, including the full range of equivalents to which each element thereof is entitled.

I claim:
1. An apparatus adapted to serve as bumper and air storage tank for a vehicle, said apparatus comprising:
   an elongated bumper for a vehicle, said bumper having inner and outer faces;
   said bumper being adapted for attachment to a vehicle with the bumper being adjacent to the periphery of the vehicle;
   said bumper having a chamber therein, said chamber being substantially airtight and adapted to have compressed air therein;
   valve means on the bumper for controlling the flow of air into and out of the chamber;
   an air compressor;
   means for mounting said air compressor on said bumper on the same side thereof as said inner face and with the air compressor being adjacent said inner face;
   said valve means comprising an inlet valve and an outlet valve on said inner face of said bumper and said apparatus including an inlet conduit adapted to be coupled between said air compressor and said inlet valve to permit said air compressor to furnish compressed air to said chamber; and
   said mounting means mounting the air compressor on said inner face of the bumper and the apparatus including an electric motor capable of being powered by the battery of the vehicle to which the bumper is attachable for driving the air compressor, and said valve means including a quick disconnect fitting for attaching and detaching a conduit to one of said valves.

* * * * *